C. ELLIS.
SOLVENT.
APPLICATION FILED JAN. 8, 1918.
1,365,049.
Patented Jan. 11, 1921.
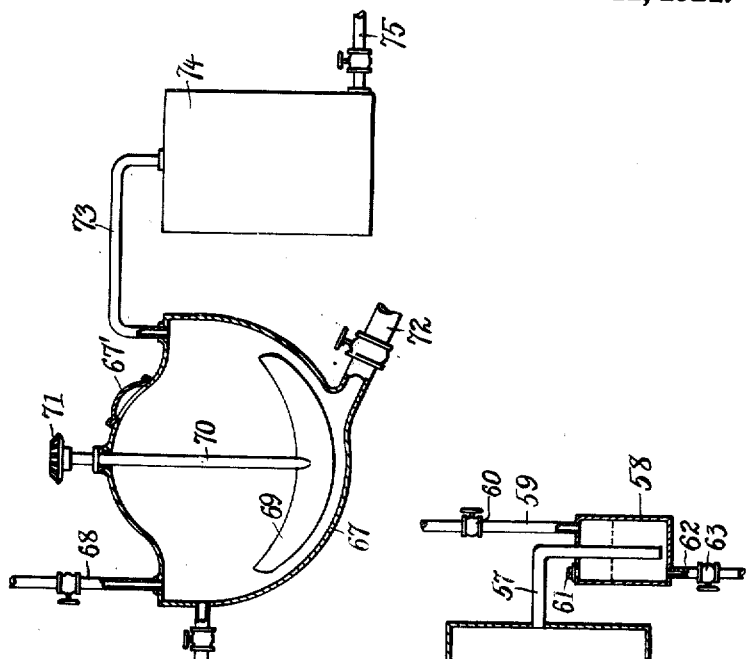
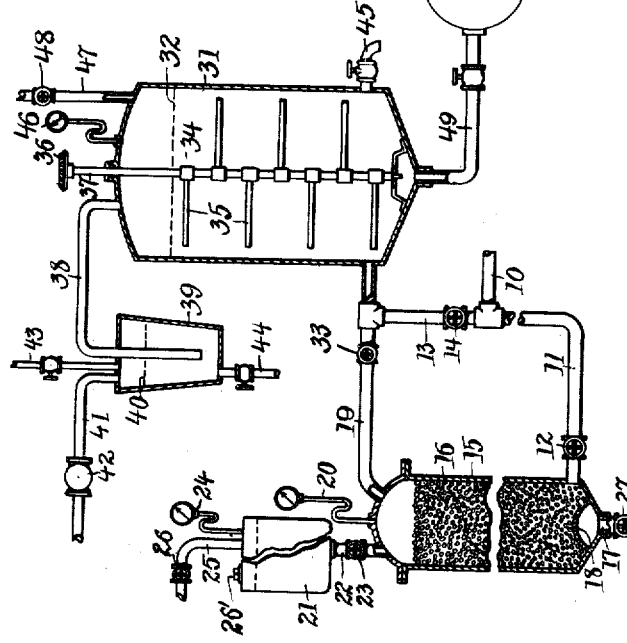
INVENTOR.
Carleton Ellis
BY H. H. Dyke
ATTORNEY ical reactions occur which are
UNITED STATES PATENT OFFICE.

CARLETON ELLIS, OF MONTCLAIR, NEW JERSEY, ASSIGNOR, BY MESNE ASSIGNMENTS, TO SETH B. HUNT, TRUSTEE, OF NEW YORK, N. Y.

SOLVENT.

1,365,049. Specification of Letters Patent. Patented Jan. 11, 1921.

Application filed January 8, 1918. Serial No. 210,835.

*To all whom it may concern:*

Be it known that I, CARLETON ELLIS, a citizen of the United States, and a resident of Montclair, county of Essex, and State of New Jersey, have invented certain new and useful Improvements in Solvents, of which the following is a specification.

This invention relates to the production of solvent material for varnish, such as varnish for airplane wings. The varnish material or base generally used for this purpose is nitro-cellulose, as gun cotton or celluloid. Cellulose acetate is also used to provide a non-inflammable varnish. Solvent materials in which the solvent of the present invention is used work well with this and other varnish materials.

Ethyl acetate is commonly used as a solvent for airplane wing varnish, as ethyl alcohol is substantially the only suitable alcoholic material available in quantities from which to produce the acetate. Solvents of somewhat higher boiling points than ethyl acetate, however, if available, may be utilized for such solvent purposes.

According to the present invention mixed esters, preferably acetates, boiling up to about 100° C.–110° C., are preferably made use of and these acetates are produced from and correspond to unsaturated hydrocarbon material contained in gaseous cracked petroleum material, as, for example, still gases available about petroleum refineries in various distilling and cracking operations there carried on, and which are usually burned for fuel with consequent loss of much valuable material, or in some cases are compressed to condense therefrom light naphtha of a highly volatile character. The use of the term "cracked petroleum material" herein is not to exclude other materials containing unsaturated hydrocarbon material, such for example as shale oil.

The gaseous cracked petroleum material, as still gases, in some cases contains unsaturated hydrocarbons which are highly sensitive and exhibit a marked resinification tendency in the presence of sulfuric acid, and which are not so well suited for use in accordance with the present invention, in which other unsaturated hydrocarbon material that is not as sensitive is preferably utilized for the production of suitable solvent material. According to the present invention means are provided for extracting such more sensitive unsaturated hydrocarbons from the gaseous material separately and saving them for separate utilization, as, for example, for separate production of ester material or for the production of alcoholic material by hydrolysis therefrom, &c., and the gases, having been substantially freed from such more sensitive unsaturated hydrocarbons, or at least having the content thereof substantially reduced, the less sensitive unsaturated hydrocarbon material is extracted separately and from it are produced the mixed esters which provide the solvent of the present invention.

Sulfuric acid is preferably made use of for extracting the unsaturated hydrocarbon materials from the still gases of petroleum, but other acids may be made use of, and the sulfuric acid may have other acid or acids mixed therewith to modify somewhat the extracting action obtained. The use of sulfuric acid will be described, but it is understood that this is for affording a clear understanding of the invention only and is not designed to operate as a limitation to the use of sulfuric acid only.

The extraction in each step is preferably carried on under sulfating conditions, that is to say, under conditions, such as pointed out more fully below, whereby the action of the sulfuric acid upon the unsaturated hydrocarbon materials is substantially confined to the production of sulfated materials or to the absorption or solution of the unsaturated hydrocarbons in the sulfuric acid and whereby extensive chemical action resulting in giving off $SO_2$ gas and the production of tarry sludge-like and charred material, and the production of heavy polymers of the unsaturated hydrocarbons is largely or entirely avoided.

There are a number of factors involved in obtaining proper control of the acid treatment so that it may be carried out under sulfating conditions as defined above.

The time factor of acid treatment is an important one, and preferably an unduly prolonged exposure of the saturated hydrocarbon material to the action of the acid or mixtures of acids is to be avoided. The temperature is also to be regulated with care, as with too high a temperature undesirable chemical reactions occur which are productive of resinous and tarry sludges and other objectionable material. The use of varying strengths of acid also affords a means of control, the rate of acid supply is another control factor as is also the quantity of acid used. Thorough mixing or agitation is of assistance in controlling the operation, which is preferably carried on under pressure, and the variation of the pressure used affords an additional means of control, and still other means of control may be resorted to.

In the case of the first extraction for removal of the more sensitive unsaturated hydrocarbon material the various control factors are preferably substantially fully utilized, as, for example, the extraction is preferably carried on in the cold and with acid of a moderate degree of dilution, whereas in the second stage where the less senstive hydrocarbons are being extracted generally, the various elements of control need not be so closely followed out, as, for example, heat may be applied and sulfuric acid of higher gravity may be used and still the extraction be carried on under sulfating conditions for the extraction of the fraction of the unsaturated hydrocarbon material best adapted to the purposes of the present invention.

After such fraction has been extracted the acid extract may be centrifuged or otherwise separated from any other materials present, as, for example, condensed saturated hydrocarbon material, and mixed esters corresponding to such unsaturated hydrocarbon material are produced therefrom by direct reaction thereon with organic acid material such as the salt of an organic acid, as, for example, calcium acetate, and upon distillation the mixed ester material obtained boils largely under 100° to 110° C., and such fraction is available for use as a solvent material in accordance with the present invention. The process of reacting directly upon acid extract made from the unsaturated hydrocarbon material with a salt such as calcium acetate of cracked petroleum material, however, is not claimed *per se* in the present case, as the same is a joint invention of Mortimer J. Cohen, of New York city, New York, and myself.

In the accompanying drawings I have illustrated apparatus by means whereof the solvent material of the present invention may be produced. The apparatus shown is only for affording an understanding of one form of apparatus which may be used, and not for limitation of the invention. In said drawing Figure 1 is a diagrammatic view showing certain forms of apparatus for this purpose, and Fig. 2 is a similar view of a modified form of apparatus.

10 is a gas supply pipe for supplying gases containing unsaturated hydrocarbon material. The supply pipe 10 as shown has two branches, the branch 11 being provided with a valve 12 and the branch 13 with a valve 14, so that the passage of gases may be controlled at will. The pipe 11 leads to preferably the lower end of a tower 15 which is preferably of fairly considerable height. In the drawing it is shown broken away between its ends because of a lack of room to show it fully. The tower is preferably provided with means (not shown) for temperature control, which may consist of an internal coil or an external jacket, or both, or other common and well known means for this purpose may be used. The tower is preferably filled to near its top with refractory material 16 for securing great contact surface, such material as gravel, coke and the like, being well adapted for this purpose. The outlet 17, which is preferably located at the bottom of the tower, is preferably guarded by a screen of some kind to prevent clogging, a domed apertured plate 18 being illustrated for this purpose.

19 is the gas outlet pipe for the tower and is preferably located at about the top thereof. The tower may be provided with a pressure gage 20 for indicating the pressure therein when the tower is operated under pressure.

Means are provided for supplying acid to the tower so that it may pass downward from substantially the top thereof, and means are also preferably provided for regulating the supply of acid. In the form shown a tank 21, which may contain acid up to the dotted liquid level, is illustrated, and it is connected by a pipe 22 to about the top of the tower 15, the flow of acid being regulated by a valve 23 in the pipe 22. The acid tank 21 may have a pressure gage 24 for showing the pressure maintained therein when operated under pressure, and if it should be operated under pressure, the pressure may be maintained above the surface of the acid therein, as, for example, by means of a gas or compressed air pipe 25 controlled by a valve 26. Fluid pressure may be obtained from any source for maintaining pressure on the surface of the acid, but one mode for securing suitable pressure is to connect the pipe 25 with the gas supply pipe 10, whereby the pressure within the tower 15 and above the surface of the acid is equalized so that the acid may flow by gravity without the entrance of acid into the tower being opposed and prevented by the pressure existing therein. As the supply of acid is exhausted it may be renewed as by means of fresh acid introduced through the filling opening 26', which ordinarily is plugged, it being understood, of course, that the valves 23 and 26 are shut off at such time as the acid supply in the tank 21 is being replenished. The outlet 17 is controlled by a valve 27 by means of which the acid extract formed in the tower 15 is drawn off. As such acid extract may be accompanied by other bodies, as, for example, condensed saturated hydrocarbon material, means are preferably provided for effecting a separation between the acid extract and such other generally lighter materials, and in the form shown a separator 28 is illustrated diagrammatically. Any efficient separator may be utilized for this purpose, as, for example, a centrifugal separator may be used, and the acid extract may be discharged from this separator through the preferably valved pipe 29, while the materials separated therefrom may be discharged through another pipe as 30.

The branch 13 of the supply pipe 10 is connected to a tank 31 preferably at about the bottom thereof and which may contain sulfuric acid, as, for example, to about the level indicated by the dotted line 32, through which the gases may pass, rising in the liquid until they pass beyond the surface thereof at the upper portion of the tank 31. The gases may be admitted to the tank 31 directly through the branch pipe 13 controlled by the valve 14, or, if desired, the valve 14 may be shut off and the gases leaving the tower 15 by the pipe 19 may be entered into the extraction tank 31 by opening the valve 33.

The extraction tank 31 is preferably equipped with an agitator, and in the form shown a vertical agitator 34 is used having stirring arms, blades, paddles or the like 35. The agitating device may be operated in any desired way, and in the form shown power may be applied through the bevel gear 36 secured on the upwardly projecting end of the agitator shaft 37.

Means for leading off the gases remaining after extraction in the tank 31 may be provided at or near the top of the tank, and the outgoing gases may be discharged through the pipe 38 connected to the tank 31 at about the top thereof. Means are preferably provided for trapping any liquid, spray or vaporous materials carried by the outgoing gases, and in the form shown the pipe 38 is led to about the bottom of a vessel 39 which may be filled with liquid material, preferably sulfuric acid, to about the level indicated by the dotted line 40, and the outgoing gases, in passing through the liquid material in the vessel 39, deposit therein any liquid, spray or vaporous material borne thereby. A plurality of trapping devices of this or other forms may be provided if desired. From the trap or traps the gases pass out through the pipe 41, which is shown connected with the top of the closed vessel 39 and is preferably equipped with some form of means for pressure regulation, means of pressure control being indicated diagrammatically at 42. After passing the pressure regulator 42, the gases are finally discharged from the apparatus. Means for supplying liquid, as sulfuric acid, to the trapping vessel 39, and for drawing off liquid material from the bottom thereof, may be provided, and the same may comprise a valved supply pipe 43 and a valved discharge pipe 44.

The discharged gases may be disposed of in any desired way. If, for example, they should be compressed to condense light naphtha therefrom, the liquid material so obtained has its content of unsaturated hydrocarbon material so reduced that there exists no necessity for the usual sulfuric acid sludging treatment to which the naphtha, obtained by compression of still gases from which unsaturated hydrocarbon material has not been extracted prior to compression, is subjected in accordance with the usual petroleum refinery practice where gas condensers are installed. The tank 31 is preferably provided with any ordinary means of temperature regulation and control (not shown) such as a circulating coil or coils or a surrounding jacket, or other equivalent means of temperature control may be used.

The tank 31 is preferably provided with means for drawing off the acid extract from time to time and subjecting it to tests, as, for example, to make tests of the specific gravity to determine the degree of extraction secured, and in the form shown a draw-off cock 45 is provided which may be utilized for this purpose or for other purposes.

The tank 31 is preferably equipped with a pressure gage 46 and with an acid supply pipe 47 preferably having a valve 48. The acid extract which is formed in the tank 41 is drawn off from the bottom thereof, as by means of the pipe 49, and may be subjected to further treatment presently to be described.

Various other forms of apparatus for extracting unsaturated hydrocarbon material from the gases containing the same may be resorted to. For example, one alternative device for such purpose is shown in Fig. 2, in which 50 indicates a tank, preferably closed and preferably arranged horizontally, as shown, though it may be arranged in other ways. Means are preferably provided for causing gases and vapors to travel in extended or circuitous paths within the tank 50, and for this purpose various means may be provided, as, for example, baffle plates 51, 51 extending from the top of the tank, and intermediate baffle plates 52, 52 extending from the bottom of the tank may be utilized. When baffle plates as 52 extend from the bottom of the tank, they are preferably provided with openings 53, 53 at about the bottom to prevent pocketing.

Means for mingling the gases with the sulfuric acid in the form of spray or vapor in the tank 50 are provided, and the same may comprise spray nozzles of various forms. When the gases are compressed or can be obtained under pressure, as, for example, the pressure of cracking stills, the gas pressure may be utilized, with or without reduction, for forming a spray with the sulfuric acid, and in this way extensive contact between the unsaturated hydrocarbon materials and the sulfuric acid may be obtained. Such contact may be increased by the passage of the sprayed vaporous material through the circuitous paths provided therefor, as for example, around and between the baffles 51 and 52. In the structure shown the gases are introduced through a pipe 54 having a Venturi passage 55 adjacent to which the outlet or nozzle of the sulfuric acid supply pipe 56 is arranged and preferably in such relation as that the discharge of the gases creates a suction drawing the acid along with the gases from a supply, as in a suitable vessel or tank, or, if preferred, pressure may be applied to the acid to force it in by any suitable means. This, however, is usually unnecessary when gases under pressure are available, as the suction created by the discharge of the gases may be relied upon to secure the supply of sulfuric acid at the nozzle.

The outgoing gases from which unsaturated hydrocarbon material has been extracted by the acid may be discharged as through the pipe 57, and the gases may be passed through a trap 58 similar to the trap 39 already referred to, from which they may be discharged by the pipe 59, preferably provided with a valve 60 or other means of pressure control. The trap 58 may be charged with liquid or its supply replenished by the filling opening 61, and as material collects therein it may be drawn off through a draw-off pipe 62 having a valve 63. The acid extract collects in the tank 50 and may be drawn off as by means of the valved outlet pipe 50′. The tank 50 may be equipped with suitable means for temperature control.

The acid extract obtained from the tank 31 or from other extract forming apparatus, as the tank 50, is preferably first subjected to a separating action as by means of a settling tank, centrifuge or other separating apparatus indicated diagrammatically at 64, Fig. 1. By means of the separator 64 the acid extract may be separated out from other material, as, for example, any light condensed saturated hydrocarbon material which may collect in a layer on its surface, or any tars or polymers of the unsaturated hydrocarbon material which may be present. The material or materials separated out may be withdrawn from the acid extract as by a pipe 65, and the acid extract is delivered from the separator through a pipe 66 into the ester forming apparatus 67. The ester forming apparatus 67, as illustrated, has the form of a kettle, and heat may be applied thereto in any desired way. Other materials to be used in addition to the acid extract may be introduced into the kettle 67 in any desired way, as, for example, water may be admitted through the pipe 68, and when the acetic ester or esters are to be formed, a salt of acetic acid, as calcium acetate, may be introduced through the removable cover plate 67′ which is preferably of such construction that the kettle 67 may be closed tightly and operated, if desired, under pressure. Agitating means are preferably provided, as a paddle 69 on a shaft 70, which may be rotated by any suitable means applied, for example, to the gear wheel 71. The paddle or other agitating device is preferably of fairly heavy construction so that its operation will not be interfered with by the presence of heavy or insoluble materials. The kettle 67 is provided with a preferably large bottom draw-off pipe 72, and the gaseous and vaporous materials are distilled over, as through a pipe 73, and may be condensed by a condenser 74, and the condensed material may be collected and drawn off by the outlet pipe 75 connected to the pipe 73 through the condenser coils.

The operation of the apparatus which has been described will now be readily understood. The extraction may be carried on by any of the various extraction apparatus illustrated, or by various other forms of extraction apparatus. The gases are preferably first dried before admission to the extraction apparatus in order to prevent undue water dilution of the acid. When extraction apparatus of the form shown in Fig. 1 is used, the preferably dried gases enter through the pipe 10 and are preferably passed through the tower 15, where the more sensitive and more readily extractable unsaturated hydrocarbon material is extracted, preferably dilute sulfuric acid being used and preferably in the cold. A series of towers may be used, if desired. The gases, after extraction of more highly sensitive unsaturated hydrocarbon material, which may be drawn off and separately utilized to yield products of value, pass through the pipe 19 into the extraction apparatus 31, entering directly into a large quantity of concentrated sulfuric acid, whereby substantially all or the greater part of the unsaturated hydrocarbon material is extracted. This extraction may be carried out with concentrated sulfuric acid, which may be sulfuric acid of a specific gravity of 1.8 or 1.84, or fuming sulfuric acid may be used and the extraction may be carried on at a higher temperature, and the temperature of the reaction may be utilized, or heat may be applied as by means of steam, or in various other ways, the strength of the acid and the temperature being regulated with the material under treatment so that it may be carried out under sulfating conditions. In this way more difficultly extractable unsaturated hydrocarbon material may be extracted by the acid, and especially unsaturated hydrocarbon material having a relatively low number of carbon atoms may be efficiently extracted, the extraction preferably being carried out with violent agitation and under pressure so that the gases are greatly concentrated and substantially the full extracting power of the acid may be utilized. The acid extract so obtained and containing principally unsaturated hydrocarbon material adapted for the production of ester material of low boiling point, preferably after being separated from other materials present, as condensed saturated hydrocarbon material, is entered into the kettle 67 and water and calcium acetate added, the agitator 69 being used to keep the materials in constant agitation, and these materials are preferably digested together for a period of several hours, after which heat is applied, whereupon the mixed acetates corresponding to the mixed unsaturated hydrocarbons present in the petroleum material and extracted therefrom by the sulfuric acid, are distilled over, and after passing through the condenser are collected at the pipe 75. The condenser is preferably connected up and kept cooled during the digestion period to save any acetate material which may come over.

Substantially all or the greater part of the mixed acetates so obtained boil below 110° C. and are well adapted for solvent use for airplane wing varnish or other varnish or material requiring an efficient and quick drying solvent. The material may be further refined, if desired, as by redistillation, and preferably any small quantity of material coming over on redistillation above, say, 110° C. is collected separately to be used where higher boiling solvents are required. Other esters than the acetic esters may be produced, if desired. An alternative mode of producing the solvent material of the present invention is by hydrolyzing the acid extract to obtain light alcoholic material corresponding to the unsaturated hydrocarbon material extracted, and then esterifying the alcoholic material so obtained. If desired, the still gases may be compressed into liquid form before the extraction is carried out.

Without limitation to specific components or proportions, the varnish solvent material which may be obtained in the foregoing manner appears to consist of mono-acetic esters, containing a major portion of propyl mono-acetate with somewhat lesser quantities of ethyl acetate and of butyl acetate, the propyl and butyl acetates appearing to be mainly of the iso type, and the material boiling within the indicated range being substantially free of amyl and higher acetates.

I claim:

1. As a new composition of matter, a solvent composed of a mixture of mono-acetic esters corresponding to unsaturated hydrocarbon material of still gases of petroleum, and boiling principally under 110 degrees C.

2. As a new composition of matter, a solvent composed of a mixture of ethyl, propyl and butyl mono-acetates, and boiling principally under 110 degrees C.

3. As a new composition of matter, a solvent composed of a mixture of ethyl, propyl and butyl mono-acetates, and boiling principally under 110 degrees C., the major proportion thereof consisting of propyl acetate.

In testimony that I claim the foregoing, I have hereto set my hand, this 29th day of December, 1917.

CARLETON ELLIS.

It is hereby certified that in Letters Patent No. 1,365,049, granted January 11, 1921, upon the application of Carleton Ellis, of Montclair, New Jersey, for an improvement in "Solvents," errors appear in the printed specification requiring correction as follows: Page 2, line 46, strike out the words "with a salt such as calcium acetate" and insert the same to follow the word "material" in line 47; and that the said Letters Patent should be read with these corrections therein that the same may conform to the record of the case in the Patent Office.

Signed and sealed this 7th day of June, A. D., 1921.

[SEAL.]

KARL FENNING,

*Acting Commissioner of Patents.*

Cl. 134—79.